March 10, 1931. R. N. VICKERS 1,795,809
FISHING TOOL
Filed March 12, 1930
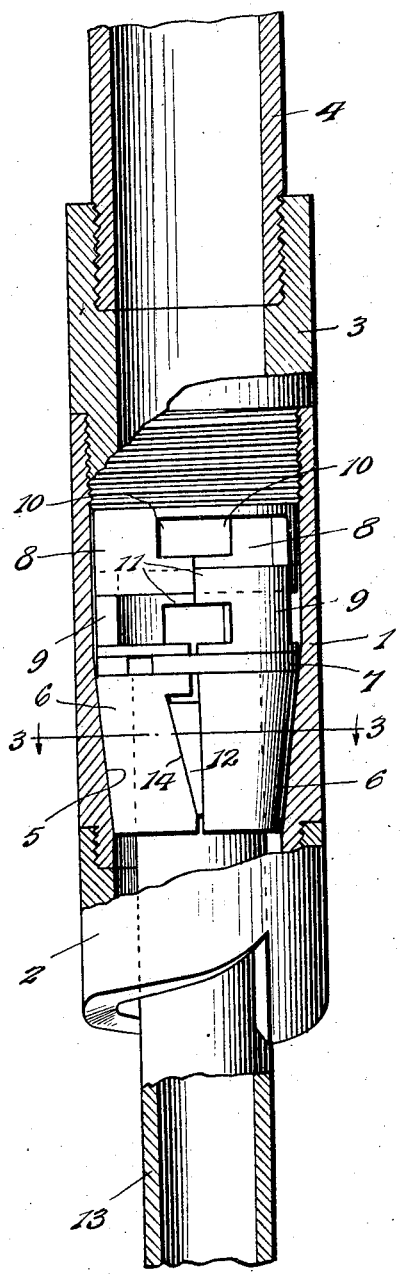
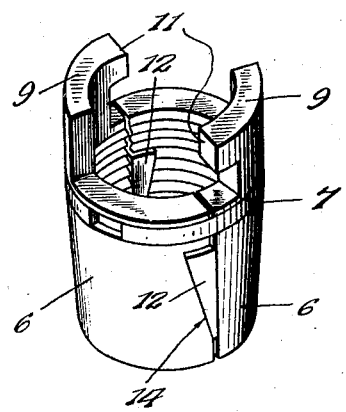
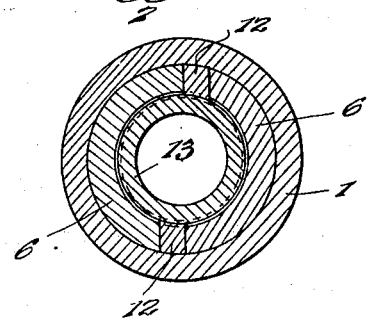
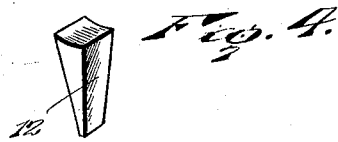
Inventor
R. N. Vickers.
By Lacey&Lacey, Attorneys Patented Mar. 10, 1931

1,795,809

UNITED STATES PATENT OFFICE

RICHARD N. VICKERS, OF SMACKOVER, ARKANSAS

FISHING TOOL

Application filed March 12, 1930. Serial No. 435,271.

This invention has relation to tools for removing drill pipe, drills, and analogous articles from deep wells when detached from the usual operating means.

The invention appertains to the type of overshot fishing tool embodying a cylindrical body or bowl having an inner tapered portion, slip jaws therein having an exterior tapered portion to coact with the corresponding tapered portion of the body, and interengaging lugs between the body and jaws to effect a release of the tool from the drill pipe or other fish, when the article lodged in the well cannot be readily withdrawn.

It is desirable and essential at times to obtain and maintain a water-tight joint between the fishing tool and the drill pipe or fish, to force water through the fish and back up and around it on the outside to assist materially in releasing the article so that it may be withdrawn. Therefore, one of the principal objects of the invention is the provision of a packing between the jaws which will insure a water-tight joint, when the fish is gripped, to prevent leakage and cause the water to flow down through and up around the fish.

While the drawings illustrate a preferred embodiment of the invention, it is to be understood that in adapting the means to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which:

Figure 1 is an elevational view, partly in section, of a fishing tool embodying the invention.

Figure 2 is a perspective view of the jaw assembly.

Figure 3 is a horizontal sectional view on the line 3—3 of Figure 1.

Figure 4 is a detail perspective view of a packing element associated with the jaws.

Corresponding and like parts are referred to in the following description and designated in the several views of the drawings by like reference characters.

The numeral 1 designates the cylindrical body, bowl or casing of the tool. The body 1 has its lower end reduced and externally threaded to receive a bottom member 2 which may be of any construction. A top member 3 is threaded to the body 1 and is adapted to have an operating pipe 4 coupled thereto. The opening in the body 1 is constricted at its lower end to provide a tapered portion 5 which is adapted to coact with jaws or slips 6, in a manner well understood. A spring band 7 holds the jaws 6 assembled and is seated in a groove formed in the outer side of the jaws adjacent their upper ends. The top member 3 may be considered part of the body although, for convenience, it is separately formed and threaded thereto. Lugs 8 are formed upon the lower end of the member 3 at diametrically opposite points and are transversely spaced. Corresponding lugs 9 project from the upper ends of the jaws and are receivable in the spaces formed between the lugs 8. A notch 10 is formed in a side of each of the lugs 8 to receive a projection 11 at the adjacent side of the respective lug 9.

A packing 12 is interposed between adjacent sides of the jaws 6 to insure a water-tight joint between the jaws, the tool and the drill pipe 13 or like part to be fished from the well. The packing 12 usually consists of lead or an alloy such as Babbitt metal, which is amenable to compressive force to insure the formation of a water-tight joint between the parts to prevent leakage when water is forced through the tool and the fish to insure its flowing upwardly around the part 13 to effect a release thereof to admit of its withdrawal. The packing 12 is of a wedge form and operates across the joint formed between adjacent sides of the jaws 6. A recess 14 is provided in a side of each of the jaws 6 to receive the packing and the inner wall of this recess is inclined to ride upon the packing and subject the same to compressive action to the end that a water-tight joint may be obtained to prevent leakage.

When the tool is lowered into a well to remove a fish therefrom, as the drill pipe 13, the upper end of the latter enters the bottom member 2 and is directed thereby between the jaws 6 which are pressed together in the accustomed manner and grip the fish. Should it become necessary to release the fish, the tool is rotated to cause the lateral projections 8 to enter the notches 10, when the jaws will clear the fish and admit withdrawal of the tool. On the other hand, a fluid medium, such as water, may be caused to flow downwardly through the operating pipe 4 of the fishing tool and drill pipe and around the fish to effect a release thereof, so that it may be extracted by withdrawal of the tool from the well. This is made possible by providing the packing 12 which insures a water-tight joint in the manner stated.

What is claimed is:

1. In a fishing tool embodying slip jaws, packing interposed between adjacent sides of the jaws to insure the formation of a water-tight joint between the tool and the object being fished for.

2. In a fishing tool embodying slip jaws, a wedge-shaped packing fitting in a corresponding recess formed between adjacent sides of the jaws.

3. A slip jaw assembly for fishing tools having a tapering recess formed in a side of each of the jaws, and a wedge-shaped packing of soft metal within said recess and adapted to operate across the joint formed between adjacent sides to insure the formation of a water-tight joint between the parts whereby a fluid is caused to flow through the tool, fish, and back around said fish.

In testimony whereof I affix my signature.

RICHARD N. VICKERS. [L. S.]